(12) United States Patent
Forkosh

(10) Patent No.: US 10,012,401 B2
(45) Date of Patent: Jul. 3, 2018

(54) METHOD AND APPARATUS FOR CONDITIONING AIR

(75) Inventor: Dan Forkosh, Aventura, FL (US)

(73) Assignee: DUCOOL LTD., D.N. Hoff Hacarmel (IL)

( * ) Notice: Subject to any disclaimer, the term of this patent is extended or adjusted under 35 U.S.C. 154(b) by 951 days.

(21) Appl. No.: 13/993,478

(22) PCT Filed: Dec. 13, 2010

(86) PCT No.: PCT/US2010/060037
§ 371 (c)(1),
(2), (4) Date: Jun. 12, 2013

(87) PCT Pub. No.: WO2012/082093
PCT Pub. Date: Jun. 21, 2012

(65) Prior Publication Data
US 2013/0255287 A1 Oct. 3, 2013

(51) Int. Cl.
*F24F 3/14* (2006.01)
*F24F 11/02* (2006.01)
(Continued)

(52) U.S. Cl.
CPC .......... *F24F 3/1417* (2013.01); *B01D 53/263* (2013.01)

(58) Field of Classification Search
CPC ...... F24F 3/1411; F24F 3/1417; F24F 11/027; F24F 2012/007; F24F 13/04; F24F 13/30;
(Continued)

(56) References Cited

U.S. PATENT DOCUMENTS

| 1,863,578 A | * | 6/1932 | Morse | F24F 3/1411 |
| | | | | 261/DIG. 34 |
| 4,955,205 A | | 9/1990 | Wilkinson | |

(Continued)

FOREIGN PATENT DOCUMENTS

AU 2008200557 A1 2/2008
DE 102008026594 A1 12/2009
(Continued)

OTHER PUBLICATIONS

Written Opinion of the International Preliminary Examining Authority for corresponding Application No. PCT/US2010/060037, mailed Mar. 20, 2013, 12 pages.
(Continued)

*Primary Examiner* — Frantz Jules
*Assistant Examiner* — Erik Mendoza-Wilkenenfe
(74) *Attorney, Agent, or Firm* — Vladimir Sherman; Professional Patent Solutions

(57) ABSTRACT

An apparatus and a method for conditioning air has a quantity of liquid desiccant. A first portion of a first airflow is received in a first contact volume such that it contacts a first portion of the liquid desiccant. A second contact volume is in parallel with the first contact volume and receives a second portion of the first airflow. At least a portion of a second airflow is brought into contact with a second portion of the liquid desiccant in a third contact volume. A first heat exchanger is associated with the first portion of the liquid desiccant and configured to transfer heat between the first portion of the liquid desiccant and a first medium. A second heat exchanger is associated with the second portion of the liquid desiccant and configured to transfer heat between the second portion of the liquid desiccant and a second medium.

22 Claims, 2 Drawing Sheets

(51) Int. Cl.
*F24F 12/00* (2006.01)
*B01D 53/26* (2006.01)

(58) Field of Classification Search
CPC ... F24F 6/00; F25B 5/04; B01D 53/14; B01D 53/263; B01D 2313/083; B01D 2273/10
See application file for complete search history.

(56) References Cited

U.S. PATENT DOCUMENTS

| | | |
|---|---|---|
| 2003/0000230 A1 | 1/2003 | Kopko |
| 2007/0234743 A1 | 10/2007 | Assaf |
| 2010/0013112 A1 | 1/2010 | Forkosh |
| 2010/0050666 A1 | 3/2010 | Meyer et al. |

FOREIGN PATENT DOCUMENTS

| | | | | |
|---|---|---|---|---|
| WO | 2008053367 A2 | 5/2008 | | |
| WO | WO 2008053367 A2 * | 5/2008 | ............ | F24F 3/1417 |
| WO | 2009033208 A1 | 3/2009 | | |
| WO | 2009098173 A1 | 8/2009 | | |

OTHER PUBLICATIONS

International Search Report for corresponding Application No. PCT/US2010/060037, mailed Jan. 25, 2012, 19 pages.

* cited by examiner

METHOD AND APPARATUS FOR CONDITIONING AIR

TECHNICAL FIELD

Various embodiments of the invention relate to dehumidification and humidification in heating, ventilating, and air conditioning systems.

BACKGROUND

Heating, ventilating, and air-conditioning (HVAC) systems provide temperature and humidity controlled air to residential, commercial, and industrial buildings. Air provided by the HVAC system may need to be at a specified temperature or humidified or dehumidified to meet comfort levels for occupancy, or to be within a range for electronics, or the like. Typically outside air is dehumidified and cooled if using an air conditioning system, and it is humidified and heated if using a heating system. The temperature and humidity mechanisms may be integrated or separate.

For example, with some conventional air conditioning systems, air is cooled below its dew point by passing it over cooling coils such that water is condensed out of the air. This usually results in air at a temperature below a comfort zone temperature. The air is then heated to bring it to a desired comfort zone temperature by mixing it with warmer air already in the space being cooled or by passing it over a heating coil. The excess cooling used to dehumidify the air decreases efficiency.

If a desiccant type dehumidifier is used in an air conditioning system, the desiccant removes water to dehumidify air in the dehumidification section. The dried air can then be cooled using a cooling coil to a desired comfort zone temperature. The desiccant is regenerated in a regeneration section where water is removed from the desiccant. The desiccant can then be reused in the dehumidification section. Depending on the capacity and type of the dehumidification and regeneration sections, desiccant can be blown out of the sections at high air flow rates. A high flow rate of air flowing through the chamber containing the desiccant contacts the desiccant, entrains desiccant droplets or vapor, and causes desiccant to be lost from the HVAC system. The loss of desiccant through blow-out from the chamber during high air flow rate conditions can impair the function of the dehumidifier if insufficient desiccant is present, or can cause other problems.

SUMMARY

In some embodiments of the invention, an apparatus for conditioning air is provided with a quantity of liquid desiccant. A first contact volume is provided in which a first portion of a first airflow is received such that it contacts a first portion of the liquid desiccant. A second contact volume is in parallel with the first contact volume in which a second portion of the first airflow is received. A third contact volume is provided in which at least a portion of a second airflow is brought into contact with a second portion of the liquid desiccant. A first heat exchanger is associated with the first portion of the liquid desiccant and configured to transfer heat between the first portion of the liquid desiccant and a first medium. A second heat exchanger is associated with the second portion of the liquid desiccant and configured to transfer heat between the second portion of the liquid desiccant and a second medium.

In another embodiment, an apparatus for conditioning air is provided with a first chamber having an inlet and an outlet for a first flow of a first fluid. The first chamber contains a first portion of a liquid desiccant for removing water from the first flow moving through the chamber. A second chamber has an inlet and an outlet for a first flow of a second fluid and contains a second portion of the liquid desiccant for evaporating water from the desiccant to the second fluid. The second chamber is in fluid communication with the first chamber such that the desiccant is capable of flowing between the first and second chambers. A third chamber has an inlet and an outlet for a second flow of the second fluid, and is in parallel with the second chamber.

In yet another embodiment, a method of conditioning a fluid using a system having a first chamber, a second chamber, and a third chamber is provided. A first portion of a first fluid flows through the first chamber. The first portion of the first fluid interacts with a portion of a desiccant and transfers water between the first portion of the first fluid and the portion of the desiccant. A second portion of a first fluid flows through the second chamber. The second portion of the first fluid bypasses the first chamber. A second fluid flows through the third chamber. The second fluid interacts with at least a portion of the desiccant and transfers water between the second fluid and the at least a portion of the desiccant. The first and second portions of the first fluid are combined after the first portion of the first fluid exits the first chamber and the second portion of the first fluid exits the second chamber.

In another embodiment, an apparatus for conditioning air is provided with a quantity of liquid desiccant, a first contact volume in which a first portion of a first airflow is received such that it contacts a first portion of the liquid desiccant, a second contact volume in parallel with the first contact volume in which a second portion of the first airflow is received, and a third contact volume in which at least a portion of a second airflow is brought into contact with a second portion of the liquid desiccant. A first heat exchanger is in contact with the first portion of the liquid desiccant and configured to transfer heat between the first portion of the liquid desiccant and a first medium. A second heat exchanger is in contact with the second portion of the liquid desiccant and configured to transfer heat between the second portion of the liquid desiccant and a second medium. A vapor compression system includes a compressor, a third heat exchanger not in contact with the liquid desiccant, and a refrigerant.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
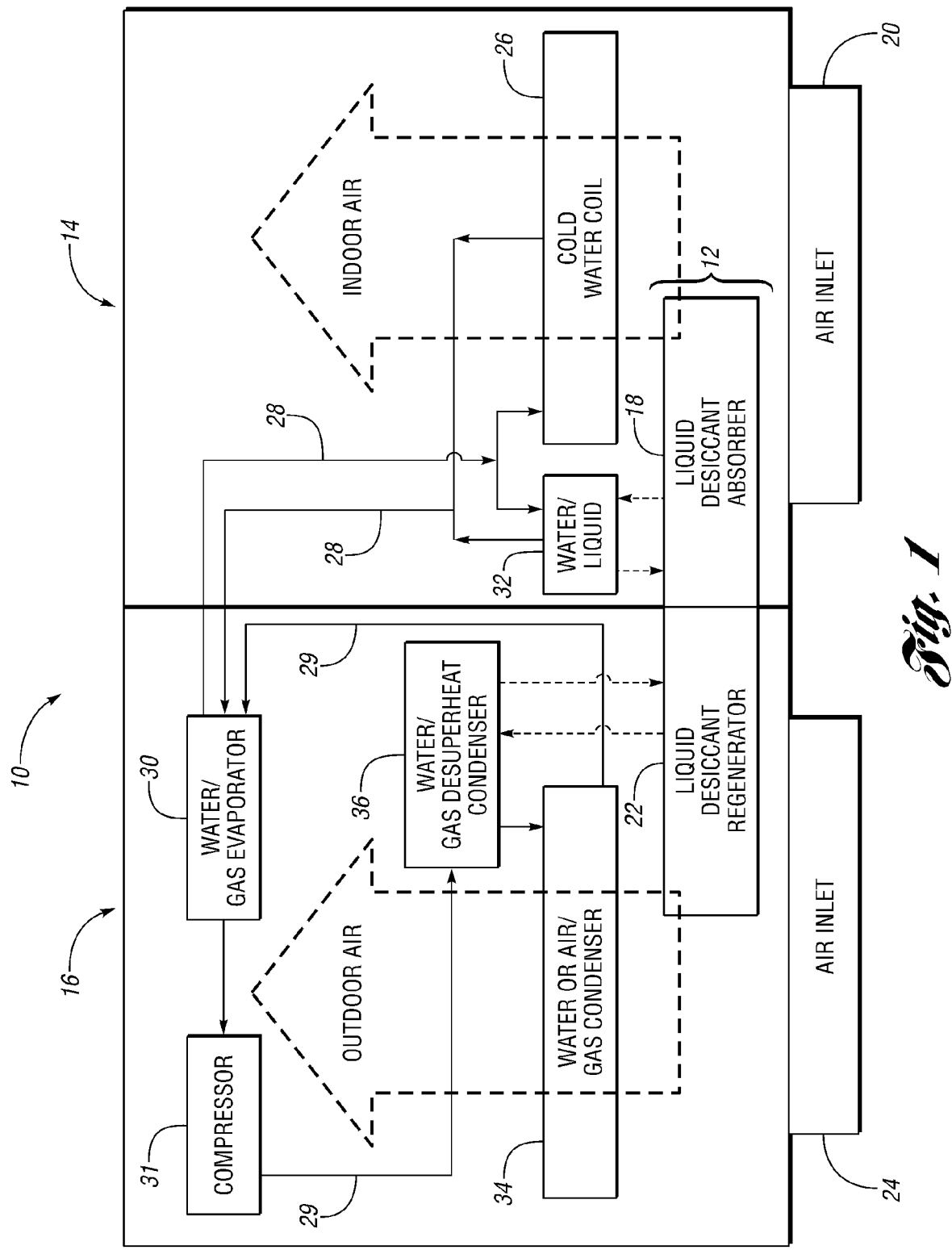
FIG. 1 is a schematic of a unit for conditioning air according to an embodiment of the invention.

A heating, ventilating, and air conditioning (HVAC) system 10 is shown schematically in FIG. 1. The system 10 has a dehumidification section or side 14 and a regeneration section or side 16, and uses a desiccant system 12 to change the humidity level of air flowing through the system 10. The dehumidification side 14 may be used as a dehumidifier to provide drier air, or as an air conditioner to provide drier, cooler air. Alternatively, the regeneration side 16 may be used as a heating system to provide warmer, higher humidity air. The desiccant is a lithium chloride salt solution. Alternatively, the desiccant includes lithium bromide, magnesium chloride, calcium chloride, sodium chloride, or the like.

The desiccant system 12 has a dehumidification chamber 18 on the dehumidification side 14 of the system 10, where a desiccant within the chamber 18 absorbs water from air flowing through the chamber 18 and contacting the desiccant. The air flowing through the chamber 18 is provided through an air inlet 20 to the dehumidification side 14. Only a portion of air entering through inlet 20 flows through the dehumidification chamber 18, and the remainder of air bypasses the chamber 18 and flows through ducting parallel to the dehumidification chamber 18 thus allowing for higher flow rates required to achieve the desired cooling in a given space or better control of the humidity level of the air exiting the dehumidification side 14. Alternatively, all of the air entering through inlet 20 flows through the dehumidification chamber 18.

The desiccant system 12 also has a regeneration chamber 22 on the regeneration side 16 of the system 10, where water is removed from the desiccant through absorption into air flowing through the chamber 22. The air flowing through the chamber 22 is provided through an air inlet 24 to the regeneration side 16. Only a portion of air entering through inlet 24 flows through the regeneration chamber 22, and the remainder of air bypasses the chamber 22 and flows through ducting parallel to the chamber 22, thus allowing for higher air flow rates or better control of the humidity of air exiting the regeneration side 16. Alternatively, all of the air entering through inlet 24 flows through the regeneration chamber 22.

The dehumidification chamber 18 and the regeneration chamber 22 are connected such that a liquid desiccant may flow between the two. The desiccant with a higher water content from the dehumidification chamber 18 is exchanged with desiccant with a lower or no water content from the regeneration chamber 22. The desiccant is transported via diffusion flow from differences in desiccant concentration, pumped flow using one or more pumps, gravitational flow using a controlled overflow, or the like.

Moist air flows through inlet 20 and through the dehumidification, or process, side 14. Inlet 20 draws air from inside a building or draws outside air to add to a building HVAC system. A fan (not shown) or other device is used to create a pressure difference to provide the air flow through the side 14. A set of dampers, or additional fans, divides and controls the air flow from the inlet 20 into two air streams.

One of the air streams from the inlet 20 flows through the dehumidification chamber 18 where water is removed from the air by the desiccant. The desiccant is a liquid desiccant and may be sprayed, contained on a sponge like material, or used as is known in the art to dehumidify the air stream. The stream of air flowing through the dehumidification chamber 18 leaves the chamber 18 with a lower water content, as a dry air portion.

The other portion of air from inlet 20 is cooled by a heat exchanger 26, such as a cold water coil or a glycol coil. The heat exchanger 26 may be directly connected to a groundwater source, or may be integrated into a larger cooling system 28 or thermodynamic system 29, such as a vapor compression cycle. The dry air portion and the other cooled portion of air are recombined before exiting the dehumidification side 14. Heat exchanger 30 is a part of the vapor compression cycle 29, or alternatively, is connected to a ground water source and integrated into cooling system 28. The heat exchanger 30 is located on the regeneration side 16 to keep the lines in vapor compression cycle 29 on the regeneration side 16, and out of the dehumidification side 14. The air flow is conditioned on the dehumidification side 14 through cooling and the removal of water moisture. Vapor compression cycle 29 has a compressor 31 to circulate a refrigerant fluid through the cycle 29, and additionally has a throttle (not shown). The heat exchangers described within the system 10 are associated with a medium such as various flows of air, desiccant, or circulating fluids, meaning that there is either direct heat transfer between a fluid flowing through the heat exchanger and the medium or there is indirect heat transfer between the fluid flowing through the heat exchanger and the medium using intermediary heat exchangers or additional mediums.

Alternatively, after the water removal in the dehumidification chamber 18, the dry air portion and the other portion of air from inlet 20 are recombined and then flow across and are cooled by a medium flowing in the heat exchanger 26.

By reducing the air flow through the chamber 18 by providing a bypassed air portion, blow-out of desiccant from the chamber 18 is prevented or reduced and higher flow rates are attainable. The flow rate through the chamber 18 is limited based on when the air flowing through the chamber begins to entrain desiccant. The flow rate of air through the dehumidification side 14 is increased by bypassing air around the chamber 18, thereby providing an air flow that is greater than what is attainable using the chamber 18 alone.

If a cooling system 28 is present, a flow of cooling fluid, such as glycol or another refrigerant, leaves the heat exchanger 30 and flows in parallel or in series to heat exchanger 26 and heat exchanger 32. The cooling fluid in heat exchanger 32 may be used to cool the desiccant before use in the dehumidification chamber 18, which additionally cools the air.

A second flow of air enters through inlet 24 and through the regeneration side 16 of the system 10. Inlet 24 may draw air from outside a building if the system 10 is used as an air conditioning system. A fan (not shown) or other device is used to create a pressure difference to provide the air flow through side 16. The air is preheated by a medium in heat exchanger 34 before it enters the regeneration chamber 22 containing the desiccant. The air is preheated to increase the amount of water that may be evaporated into the air from the desiccant. Heat exchanger 34 is a part of the vapor-compression cycle 29, or alternatively, is connected to an external heat source. The air flows through the regeneration chamber 24 where water is removed from the desiccant. The desiccant may be sprayed, contained on a sponge like material, or used otherwise as is known in the art. The desiccant is heated by a medium in heat exchanger 36 before entering the regeneration chamber 22 to aid in the evaporation water from the desiccant. Heat exchanger 36 is connected into vapor compression cycle 29, or alternatively, is connected to an external heat source. The heated air flowing through the regeneration chamber 22 leaves the chamber 22 as moist air with an increased water content.

In an embodiment, a set of dampers, or additional fans, divides the air flow through inlet 24 into two air streams, often after the heat exchanger 34. One of the air streams flows through the regeneration chamber 22, while the other air stream bypasses the chamber 22. By limiting the air flow through the chamber 22, blow-out of desiccant from the chamber 22 is prevented or reduced. The flow rate of air through the regeneration side 16 is increased by bypassing air around the chamber 22, thereby providing an air flow that is greater than what is attainable using the chamber 22 alone. The two air streams may be recombined in a mixing chamber or the like downstream of the regeneration chamber 22.

The system 10 is described previously as an air conditioning unit where the dehumidification side 14 provides a high flow rate of cooler air at an appropriate humidity level to a building, and the regeneration side 16 is used to cycle desiccant for reuse in the desiccant system 12. In other embodiments, the system 10 as described above is used as a heating unit with the regeneration side 16 providing a high flow rate of warmer air at an appropriate humidity level to a building, and the dehumidification side cycling the desiccant for reuse in the desiccant system 12. The system 10 may be used to provide air as a HVAC system using the side 14, 16 which corresponds to the HVAC purpose or requirements.

Figure 2:
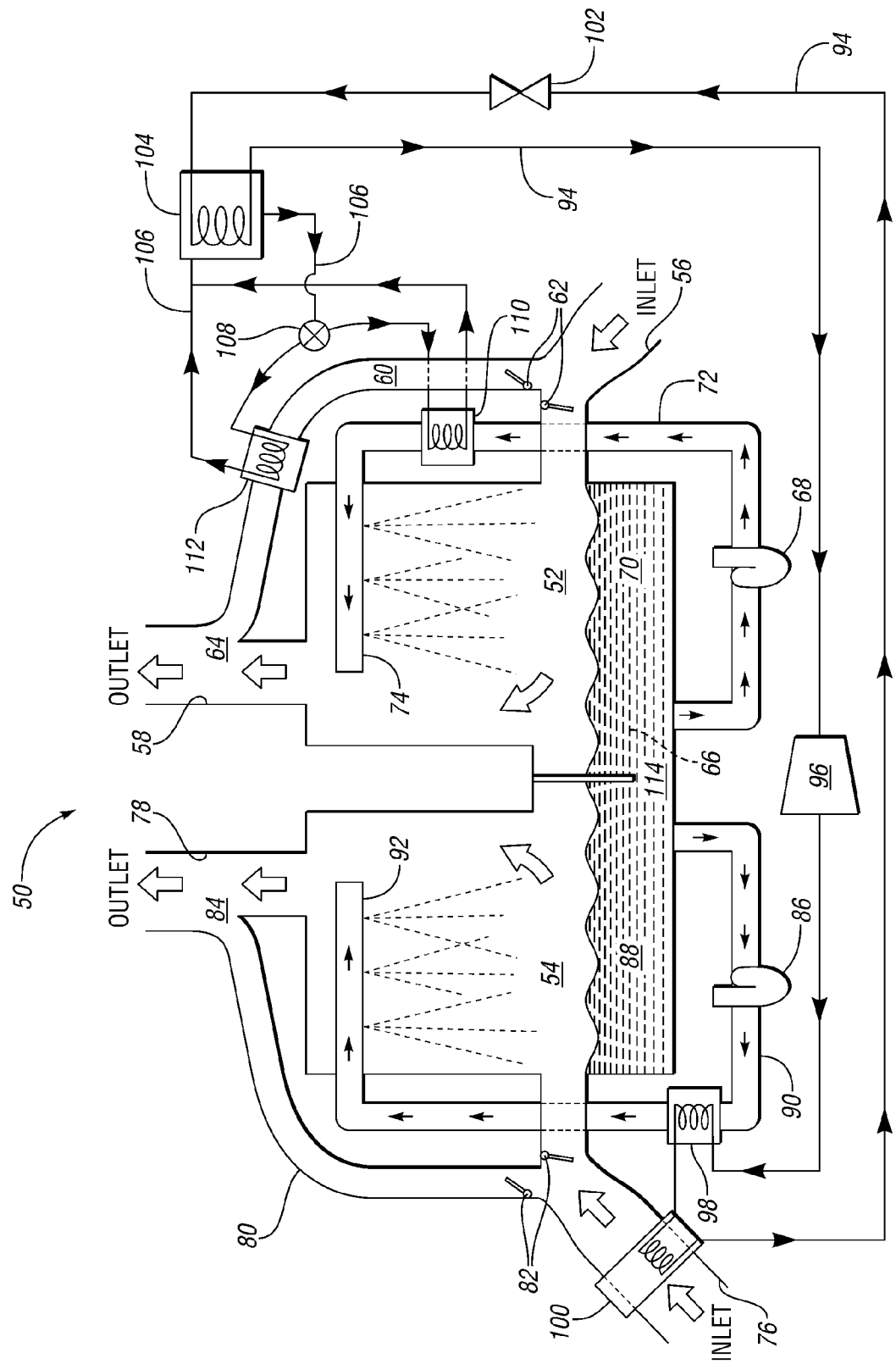
FIG. 2 is a schematic of unit for conditioning air according to another embodiment of the invention.

FIG. 2 illustrates another HVAC system 50 having a dehumidifying chamber 52 and a regenerator unit 54. The dehumidifying chamber 52 and the regenerator unit 54 provide chambers or contact volumes where air interacts and comes into contact with a desiccant. In one embodiment, the system 50 provides cooler, drier, conditioned air from the dehumidifying chamber 52, while the desiccant is regenerated in unit 54 for reuse. In another embodiment, the system 50 provides warmer, moister, conditioned air from the regenerator unit 54, while the desiccant is regenerated using the chamber 52 for reuse. The system 50 is described below as an air conditioning unit; however, the use of the system as a heater or ventilator is contemplated and functionally would also operate as described below. Differences between the system 50 as an air conditioner and as a heater are the sources of inlet air for the chamber 52 and the unit 54, and where the air from the chamber 52 and unit 54 is directed after leaving the system 50.

Moist air enters the dehumidifying chamber 52 through a moist air inlet 56, and cooler, dried air or partially dried air exits chamber 52 through a dry air outlet 58. A bypass duct 60 allows a portion of the air entering through inlet 56 to be bypassed around the dehumidifying chamber 52. The bypass duct 60 acts as a chamber or contact volume for the bypassed portion of air. A series of fan or dampers 62 control the relative portions of air flowing through the chamber 52 and the duct 60. The respective portions of air may be recombined using a mixing chamber 64 downstream of the chamber 52 and the duct 60. The bypass duct 60 allows for a higher flow rate of air (cubic feet per minute, cfm) to be provided by outlet 58 and to flow through the system 50. The addition of the duct 60 provides a mechanism to obtain higher overall flow rates at outlet 58, while maintaining air flow through the chamber 52 at a lower flow rate. The flow rate through chamber 52 is limited by when the desiccant begins to be entrained by the air flowing through the chamber 52. Without a bypass duct 60 and at high flow rates, desiccant from chamber 52 blows out of the chamber and is entrained in the exiting air at outlet 58.

Desiccant 66 is pumped from a desiccant reservoir 70 through a pipe 72 to a series of nozzles 74 using a pump 68. The nozzles 74 spray the desiccant into the interior of chamber 52. The chamber 52 may be filled with a cellulose sponge material through which the desiccant percolates downward to the reservoir 70. The portion of moist air entering the chamber 52 through inlet 56 contacts the desiccant droplets. The hygroscopic desiccant absorbs water vapor from the moist air. Drier air exits the chamber 52, mixes with the bypass air from duct 60, and exits through outlet 58.

The desiccant in the sump 70 connected to chamber 52 increases in water content as air is dried. The desiccant is regenerated for reuse by having water removed from it in a regeneration unit 54. Air enters through inlet 76 of the regeneration unit 54 and exits through outlet 78. The air flow may be divided into two portions, with one portion flowing through the regeneration unit 54, and the other portion flowing through a bypass duct 80. The bypass duct 80 acts as a chamber or contact volume for the bypassed portion of air. A series of dampers 82 or fans are used to control the relative portions of air between the unit 54 and the duct 80. The portion of air flowing through the unit 54 carries away moisture evaporated from the desiccant through outlet 78. The portions of air flowing through the unit 54 and the bypass duct 60 may be recombined in a mixing chamber 84 before exiting the outlet 78.

Desiccant 66 is pumped by a pump 86 from a desiccant reservoir 88 through a pipe 90 to a series of nozzles 92. The nozzles 92 spray the desiccant into the interior of unit 54, which may be filled with a cellulose sponge material through which the desiccant percolates downward to reservoir 88. The portion of air entering the unit 54 through inlet 76 contacts the moisture laden desiccant droplets. Water vapor is evaporated from the desiccant into the drier air, and moist air exits the chamber 54, mixes with the bypass air, and exits through outlet 78. By reducing the water content in the desiccant, the desiccant 66 is regenerated for reuse in the dehumidifying chamber 52.

The bypass duct 80 allows for a higher flow rate of air (cubic feet per minute, cfm) to be provided by outlet 78. The addition of the duct 80 provides a mechanism to obtain higher overall flow rates at outlet 78, while maintaining air flow through the unit 54 at a lower flow rate which prevents desiccant from becoming entrained into the air flowing through the unit 54. Without a bypass duct 80 and at high air flow rates, desiccant may blow-out of unit 54 and be entrained in the exiting air.

A heat transfer mechanism often occurs between the desiccant flowing through the dehumidifying side and the regenerative side. For example, a vapor compression cycle 94, such as a heat pump or refrigeration cycle, is used for the heat transfer between the high and low water content desiccants and is additionally used to cool or heat air flowing through the system 50. Of course, other cycles or heat exchangers operating independently using heat sources and sinks are also contemplated. The heat exchangers described within the system 50 are associated with a medium such as various flows of air, desiccant, or circulating fluids, meaning that there is either direct heat transfer between two mediums flowing through the heat exchanger or there is indirect heat transfer between two mediums flowing through the heat exchanger through intermediary heat exchangers or additional mediums.

The vapor compression cycle 94 includes a compressor 96, a first condenser 98, a second condenser 100, a throttle or expansion valve 102, and an evaporator 102. The heat pump 94 uses a refrigerant such as R-134a, R-1234, or others as are known in the art. The compressor 96 circulates the refrigerant through the cycle 94. The first condenser 98 acts as a heat exchanger to heat the desiccant in pipe 98. By preheating the desiccant before regenerating it in unit 54, water is more easily evaporated from the desiccant. The second condenser 100 acts as a heat exchanger to heat the air flowing through inlet 76. Warmer air flowing through unit 54 is able to retain a higher level of moisture or water at a higher temperature, which additionally assists regeneration of the desiccant 66. The evaporator 104 provides a heat exchanger which acts as a heat sink to directly or indirectly cool desiccant and air on the dehumidifying side of the system 50.

The order of the first and second condensers 98, 100 may be reversed depending on the heating requirements of the air and the desiccant. Additionally, the second heat exchanger 100 could be positioned to heat only the portion of air flowing through the unit 54, as opposed to the air flowing through inlet 76.

The evaporator 104 may be a two-stage evaporator, or two evaporators in series to directly cool the desiccant and the air on the dehumidifying side of the system 50. Alternatively, the evaporator 104 is connected to a cooling loop 106, which contains glycol, water, or another fluid. Flow within the cooling loop 106 leaves the evaporator 104, and divides at valve 108. One line in the cooling loop 106 flows through a heat exchanger 110, which is directly or indirectly in contact with the desiccant in the pipe 72 to pre-cool the desiccant before it enters chamber 52. The other line in the cooling loop 106 flows through a heat exchanger 112, in parallel with the first heat exchanger 110. The medium in the heat exchanger 112 cools the air in the bypass duct 60. By cooling the air in the bypass duct, cooler moist air from duct 60 is mixed with drier air from chamber 52 at mixing chamber 64, which allows for control over the air temperature and humidity level at outlet 58 through use of the dampers 62, fans, and a controller (not shown). Heat exchanger 112 may also be positioned at inlet 56 to cool all of the air flowing through the dehumidifying side of the system 50. Other cooling loops 106 are also contemplated, such as those having heat exchangers in series.

Cooling the desiccant on the dehumidifying side with heat exchanger 110, reduces the temperature of the desiccant in chamber 52, which contacts the air being dried in the chamber 52 and additionally reduces the temperature of the dried air.

Alternatively, the heat exchangers in the vapor compression cycle 94 and cooling loop 106 may be directly plumbed to heat sinks or sources, such as groundwater or waste heat from an associated air-conditioner or other system.

Desiccant may be transferred between the two reservoirs 70, 88 using a diffusive aperture 114, pumps, a float system, or the like. Desiccant in reservoir 70 increases in water content as the dehumidifying chamber 52 operates compared to the desiccant in reservoir 88, which equates to a higher concentration of desiccant in reservoir 88 than in reservoir 70. The desiccant needs to be regenerated for the efficiency and drying capacity of the dehumidifying chamber 52.

In the system 50 as shown in FIG. 2, the desiccant is transferred between the dehumidifying reservoir 70 and the regeneration reservoir 88 through diffusion transport. Alternatively, pumping or another system may be used. Aperture 114 allows for transfer of ions of water and desiccant salt between the reservoirs while minimizing the amount of heat transfer between the reservoirs. The dehumidifying chamber 52 continuously adds water content to the desiccant 66 in the reservoir 70. The regenerating unit 54 continuously removes water from the desiccant. During operation, the concentration of salt ions in the reservoir 88 is generally higher than that in reservoir 70 because the desiccant the regeneration reservoir 88 is being concentrated while the desiccant in reservoir 70 is being diluted. The difference in concentration causes a flow of salt ions from reservoir 88 to reservoir 70 by diffusive transport, through aperture 114, which is balanced by the flow of water ions from reservoir 70 to reservoir 88 caused by the flow of solution in this direction. This results in steady state levels of desiccant concentrations, although during changing air flow rate, start up conditions, or other system 50 transients, there will be corresponding transient period for the desiccant concentrations.

In one embodiment, the system 50 has a dehumidifying chamber (or contact volume) 52 and a regeneration chamber 54. A bypass duct (or contact volume) 60 is provided in parallel with the dehumidifying chamber 52. Liquid desiccant 66 is used in the chambers 52, 54 to change the humidity level of air flowing through the chambers 52, 54. A portion of an airflow entering inlet 56 flows into chamber 52 such that it contacts a first portion of the liquid desiccant 66 and is dehumidified. A second portion of an airflow entering inlet 56 flows through the bypass duct 60. At least a portion of a second airflow entering through inlet 76 flows into chamber 54 such that it contact a second portion of the liquid desiccant 66 and water is removed from the desiccant to regenerate the desiccant. The system 50 has a heat exchanger 110 in contact with the first portion of the liquid desiccant 66. Another heat exchanger 98 is in contact with the second portion of the liquid desiccant 66. Yet another heat exchanger 112 is not in contact with the liquid desiccant 66. In one embodiment, the heat exchanger 112 is in contact with the second portion of the first airflow in bypass duct 60. In some embodiments, the system has a vapor compression system 94 including heat exchangers 110, 98, 112, a compressor 96, and a refrigerant. In other embodiments, the heat exchangers 110, 112, 98 may be run to independent heat sources or sinks. Alternatively, the heat exchangers 110, 112 are a part of a cooling loop 106 in communication with the vapor compression cycle 94. Heat exchangers 110, 112 are arranged in parallel such that the refrigerant or cooling fluid flows in parallel to the heat exchangers 100, 112.

Heat exchanger 110 transfers heat from the desiccant 66 to the vapor compression cycle 94. Heat exchanger 112 transfers heat from the bypass air in duct 60 to the vapor compression cycle 94. This provides two sources of heat to the vapor compression cycle 94, the bypass air in duct 60 and the desiccant flowing through piping 72. The increased energy transferred into the vapor compression leads to additional energy (or heat) that may be transferred or used on the regeneration side, increasing the heat capacity available for regeneration. This additionally increases the system 50 efficiency and allows for higher airflows through the system 50. By arranging the heat exchangers 110, 112 in parallel, a higher airflow may be attained through inlet 56 and outlet 58 without blow-out of the desiccant 66 from the chamber 52.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:
1. Apparatus for conditioning air comprising:
a quantity of liquid desiccant;

a first contact volume in which a first portion of a first airflow is received such that it contacts a first portion of the liquid desiccant;

a second contact volume in parallel with the first contact volume in which a second portion of the first airflow is received;

a third contact volume in which at least a portion of a second airflow is received such that it contacts a second portion of the liquid desiccant;

a first heat exchanger associated with the first portion of the liquid desiccant and configured to transfer heat between the first portion of the liquid desiccant and a first medium; and a second heat exchanger associated with the second contact volume and configured to transfer heat between the second portion of the first airflow and the first medium, the second heat exchanger and the first heat exchanger being arranged in a cooling loop containing the first medium.

2. The apparatus of claim 1 further comprising a fourth contact volume in parallel with the third contact volume in which a second portion of the second airflow is received.

3. The apparatus of claim 1 further comprising at least one damper to control relative amounts of the first and second portions of the first airflow flowing to the first and second contact volumes, respectively.

4. The apparatus of claim 1 further comprising a third heat exchanger associated with the second portion of the liquid desiccant and configured to transfer heat between the second portion of the liquid desiccant and a second medium.

5. The apparatus of claim 4 further comprising a vapor compression system including the third heat exchanger, a fourth heat exchanger, and a compressor, wherein the fourth heat exchanger is configured to transfer heat between the first medium and the second medium.

6. The apparatus of claim 5 further comprising a cooling loop having the first medium circulating therethrough, the cooling loop including the first heat exchanger, the second heat exchanger, and the fourth heat exchanger.

7. The apparatus of claim 1 further comprising a mixing chamber downstream of the first and second contact volumes for combining the first and second portions of the first airflow.

8. The apparatus of claim 1 further comprising a third heat exchanger in communication with the at least a portion of the second airflow before it flows into the third contact volume, the third heat exchanger configured to transfer heat between the at least a portion of the second airflow and a second medium.

9. Apparatus for conditioning air comprising:
a first chamber having an inlet and an outlet for a first flow of a first fluid, the first chamber containing a first portion of a liquid desiccant for removing water from the first flow moving through the chamber;

a second chamber having an inlet and an outlet for a first flow of a second fluid, the second chamber containing a second portion of the liquid desiccant for evaporating water from the desiccant to the second fluid, the second chamber in fluid communication with the first chamber such that the desiccant is capable of flowing between the first and second chambers;

a third chamber having an inlet and an outlet for a second flow of the second fluid, the third chamber in parallel with the second chamber;

a first heat exchanger associated with the first portion of the liquid desiccant and configured to transfer heat between the first portion of the liquid desiccant and a first medium; and a second heat exchanger associated with the second portion of the liquid desiccant and configured to transfer heat between the second portion of the liquid desiccant and the first medium, the second heat exchanger being arranged with the first heat exchanger in a fluid loop, the first medium flowing through both the first and second heat exchangers.

10. The apparatus of claim 9 further comprising a common inlet for the second fluid; and
a flow divider positioned within the common inlet for the second fluid, and being adapted to partition the second fluid between the first flow of the second fluid through the inlet to the second chamber and the second flow of the second fluid through the inlet to the third chamber.

11. The apparatus of claim 9 further comprising a fourth chamber having an inlet and an outlet for a second flow of the first fluid, the fourth chamber in parallel with the first chamber.

12. The apparatus of claim 11 further comprising a common inlet for the first fluid; and
a flow divider positioned within the common inlet for the first fluid, and being adapted to partition the first fluid between the first flow of the first fluid through the inlet to the first chamber and the second flow of the first fluid through the inlet to the fourth chamber.

13. The apparatus of claim 11 further comprising a mixing chamber in communication with the outlet of the first chamber and the outlet of the fourth chamber for combining the first flow and the second flow of the first fluid.

14. The apparatus of claim 9 further comprising a cooling loop containing a second medium circulating therethrough, the cooling loop being associated with the first heat exchanger, the cooling loop having:
a third heat exchanger in contact with the first portion of the liquid desiccant and configured to transfer heat between the first portion of the liquid desiccant and the second medium; and
a fourth heat exchanger in contact with the second flow of the first fluid and configured to transfer heat between the second flow of the first fluid and the second medium.

15. The apparatus of claim 14 wherein the fourth heat exchanger is in parallel with the third heat exchanger in the cooling loop.

16. The apparatus of claim 14 wherein the cooling loop has a valve configured to vary the amount of cooling fluid flowing to the third and fourth heat exchangers.

17. The apparatus of claim 14 wherein the first heat exchanger is configured to transfer heat between the first medium and the second medium.

18. A method of conditioning a fluid using a system having a first chamber, a second chamber, and a third chamber, the method comprising:
flowing a first portion of a first fluid through the first chamber, the first portion of the first fluid interacting with a first portion of a desiccant and transferring water between the first portion of the first fluid and the portion of the desiccant;
flowing a second portion of a first fluid through the second chamber, the second portion of the first fluid bypassing the first chamber;
flowing a second fluid through the third chamber, the second fluid interacting with a second portion of the desiccant and transferring water between the second fluid and the second portion of the desiccant;

combining the first and second portions of the first fluid after the first portion of the first fluid exits the first chamber and the second portion of the first fluid exits the second chamber;

exchanging heat between a medium and the first portion of the desiccant using a first heat exchanger; and exchanging heat between the medium and the second portion of the first fluid using a second heat exchanger, the second heat exchanger and the first heat exchanger being arranged in a cooling loop containing the medium, the medium flowing through both heat exchangers.

19. Apparatus for conditioning air comprising:

a quantity of liquid desiccant;

a first contact volume in which a first portion of a first airflow is received such that it contacts a first portion of the liquid desiccant;

a second contact volume in parallel with the first contact volume in which a second portion of the first airflow is received;

a third contact volume in which at least a portion of a second airflow is brought into contact with a second portion of the liquid desiccant;

a first heat exchanger in contact with the first portion of the liquid desiccant and configured to transfer heat between the first portion of the liquid desiccant and a first medium;

a second heat exchanger in contact with the second portion of the first airflow and configured to transfer heat between the second portion of the first airflow and the first medium;

a third heat exchanger in contact with the second portion of the liquid desiccant and configured to transfer heat between the second portion of the liquid desiccant and a second medium; and a vapor compression system including a compressor, the third heat exchanger, and the second medium.

20. The apparatus of claim 19 further comprising a fourth heat exchanger configured to transfer heat between the first medium and the second medium.

21. The apparatus of claim 19 further comprising a cooling loop including the first heat exchanger and the second heat exchanger, the cooling loop containing the first medium, wherein the first medium flows in parallel to the first heat exchanger and the second heat exchanger.

22. The apparatus of claim 21 wherein the cooling loop includes a valve configured to control a portion of the first medium flowing to the first heat exchanger and another portion of the first medium flowing to the second heat exchanger.

* * * * *